(12) United States Patent
Marlin et al.

(10) Patent No.: US 8,061,967 B2
(45) Date of Patent: Nov. 22, 2011

(54) PANEL FOR SUPPORTING ABRADABLE MATERIAL IN A TURBOMACHINE

(75) Inventors: Francois Marie Paul Marlin, Villiers Sous Grez (FR); Philippe Verseux, Draveil (FR)

(73) Assignee: Snecma, Paris (FR)

( * ) Notice: Subject to any disclaimer, the term of this patent is extended or adjusted under 35 U.S.C. 154(b) by 471 days.

(21) Appl. No.: 12/329,919

(22) Filed: Dec. 8, 2008

(65) Prior Publication Data
US 2010/0329843 A1     Dec. 30, 2010

(30) Foreign Application Priority Data
Dec. 14, 2007  (FR) ...................................... 07 08712

(51) Int. Cl.
*H02C 7/05*      (2006.01)
(52) U.S. Cl. .......................................................... 415/9
(58) Field of Classification Search ............... 415/9, 200, 415/119, 197, 170.1, 173.4, 174.2; 181/214, 181/213, 292; 60/223
See application file for complete search history.

(56) References Cited

U.S. PATENT DOCUMENTS

| | | | | |
|---|---|---|---|---|
| 4,534,698 A | * | 8/1985 | Tomich | 415/9 |
| 5,344,280 A | * | 9/1994 | Langenbrunner et al. | 415/9 |
| 5,431,532 A | * | 7/1995 | Humke et al. | 415/9 |
| 5,486,086 A | * | 1/1996 | Bellia et al. | 415/9 |
| 5,516,257 A | * | 5/1996 | Kasprow et al. | 415/9 |
| 6,619,913 B2 | * | 9/2003 | Czachor et al. | 415/119 |
| 7,076,942 B2 | * | 7/2006 | Schreiber | 60/223 |
| 7,246,990 B2 | * | 7/2007 | Xie et al. | 415/9 |
| 7,402,022 B2 | * | 7/2008 | Harper et al. | 415/9 |
| 7,713,021 B2 | * | 5/2010 | Finn et al. | 415/9 |
| 7,780,401 B2 | * | 8/2010 | Lenk et al. | 415/9 |
| 7,914,251 B2 | * | 3/2011 | Pool et al. | 415/9 |
| 2010/0028130 A1 | * | 2/2010 | Reed | 415/9 |

FOREIGN PATENT DOCUMENTS

| | | |
|---|---|---|
| EP | 0 184 962 A1 | 6/1986 |
| FR | 2 663 412 | 12/1991 |
| GB | 2 407 344 A | 4/2005 |

* cited by examiner

*Primary Examiner* — Alexander Gilman
(74) *Attorney, Agent, or Firm* — Oblon, Spivak, McClelland, Maier & Neustadt, L.L.P.

(57) ABSTRACT

A panel for supporting abradable material in a turbojet, the panel comprising a rigid support for fastening to an inside wall of a fan casing and having one face covered in a laminated structure carrying a layer of abradable material, the laminated structure comprising sheets of fibers embedded in a polymer, and comprising an upstream portion covered by the abradable material and a downstream portion that extends beyond the abradable material, the thickness of the downstream portion being greater than the thickness of the upstream portion and being capable of withstanding ice impacts.

15 Claims, 2 Drawing Sheets

PANEL FOR SUPPORTING ABRADABLE MATERIAL IN A TURBOMACHINE

The invention relates to a panel for supporting a layer of abradable material and also to a turbomachine including such panels.

TECHNOLOGICAL BACKGROUND OF THE INVENTION

At its upstream end, a bypass turbomachine has a fan wheel carrying a plurality of blades that rotate inside a fan casing. A cone arranged upstream from the fan wheel serves to direct the incoming air stream through the blades of the fan. In order to prevent air from flowing past the tips of the blades, which would reduce the efficiency of the turbomachine, a coating of abradable material is placed in register with the fan blades and is carried by the radially inner face of the fan casing.

While the turbomachine is operating in flight, ice forms on the surface of the cone and at the radially inner ends of the blade airfoils. Under the effect of centrifugal force, pieces of ice are ejected and then collide with the portion of the fan casing that is situated downstream from the abradable material.

To avoid damaging the inside wall of the fan casing downstream from the abradable material, glass fiber panels supported by damper pins are fastened to the fan casing. Each of these protective panels is made up of a stack of several layers of glass fibers, and the protective panels are connected downstream to soundproofing panels.

Unfortunately, the use of protective panels reduces the axial extent of the soundproofing panels, thereby contributing to increasing the sound level emitted from the turbomachine, even though it is desirable to reduce it. Furthermore, the protective panels need to made as a unit with the soundproofing panels, thereby complicating fabrication thereof and increasing their costs. Finally, during maintenance, replacing a protective panel requires the soundproofing panel that is secured thereto to be replaced as well, thereby significantly increasing costs since soundproofing panels are elements that are difficult to fabricate and therefore expensive.

At present, wide-chord blades, i.e. blades of curved section, are preferred to straight blades since their more highly-developed aerodynamic shape serves to improve the efficiency of the fan, and above all to make it better at withstanding impacts in flight against foreign bodies, such as birds, for example.

Nevertheless, the particular shape of these blades serves to lengthen the ice impact zone upstream into the abradable material that is situated in register with the fan blades. For this type of blade, the impact zone begins about two-thirds of the way along the axial extent of the abradable material and terminates downstream from the blades. Thus, the protective panels commonly used for straight blades are found to be unsuitable for a fan having wide-chord blades when it comes to protecting all of the portion of the casing that is subjected to ice impacts.

SUMMARY OF THE INVENTION

A particular object of the invention is to provide a solution to the various problems that is simple, inexpensive, and effective.

To this end, the invention provides a panel for supporting abradable material in a turbojet, the panel comprising a rigid support for fastening to an inside wall of a fan casing and having one face covered in a laminated structure carrying a layer of abradable material, the laminated structure comprising sheets of fibers embedded in a polymer, wherein the laminated structure comprises a first or upstream portion covered by the abradable material and a second or downstream portion that extends beyond the abradable material, the thickness of the downstream portion being greater than the thickness of the upstream portion and being capable of withstanding ice impacts.

Thus, the downstream protective portion is now carried by the panel carrying the abradable material rather than by the soundproofing panels located downstream therefrom. Separating the protective panels from the soundproofing panels simplifies fabrication of the protective panels, and limits the cost of maintenance operations, since replacing the laminated downstream portion no longer necessarily requires replacing the soundproofing panels.

According to another characteristic of the invention, the upstream portion of the laminated structure is of constant thickness over a major fraction of its length and is connected to the downstream portion by a zone of thickness that increases progressively going downstream. This increase in thickness serves to provide protection to the major fraction of the casing that is subjected to ice impacts.

The upstream portion of constant thickness extends over about two-thirds of the axial extent of the abradable material.

The rigid support is preferably of cellular structure and may comprise two superposed layers both of cellular structure, separated by a plate.

The cellular structure is found to be particularly advantageous since it is light in weight and easily replaced during a maintenance operation. In addition, it also presents the advantage of spreading the energy released by an ice impact on the laminated structure over a large area, thereby increasing the lifetime of the panel for supporting abradable material as a whole.

Advantageously, the cells carrying the downstream portion of the laminated structure are of smaller section than the cells carrying the upstream portion of the laminated structure.

Most ice impacts take place in the downstream portion of the laminated structure so it is preferable to reduce the sections of the cells carrying the downstream portion of the laminated structure so that the energy released by the ice impacts is spread over a maximum number of cells.

In conventional manner, the cells at the upstream and downstream ends of the support are closed by a layer of polymer foam.

Preferably, the upstream and downstream portions of the laminated structure may respectively comprise a stack of four to seven sheets of fibers and a stack of 11 to 18 sheets of fibers, and the sheets of fibers may be sheets of glass fibers embedded in an epoxy resin.

The rigid support may be of honeycomb structure and the panel may present the form of a cylindrical or conical sector.

The invention also provides a turbojet nacelle, including panels of the type described above for supporting abradable material.

The nacelle may include four to six panels for supporting abradable material that are mounted end to end.

The invention also provides an airplane turbojet, including panels of the type described above for supporting abradable material, the panels being disposed in register with the blades of the fan in such a manner that the downstream portions of the laminated structures of said panels extend downstream from the fan blades as far as soundproofing panels.

BRIEF DESCRIPTION OF THE DRAWINGS

The invention can be better understood and other details, advantages, and characteristics of the invention appear on reading the following description made by way of non-limiting example with reference to the accompanying drawings, in which.

DETAILED DESCRIPTION

Figure 1:
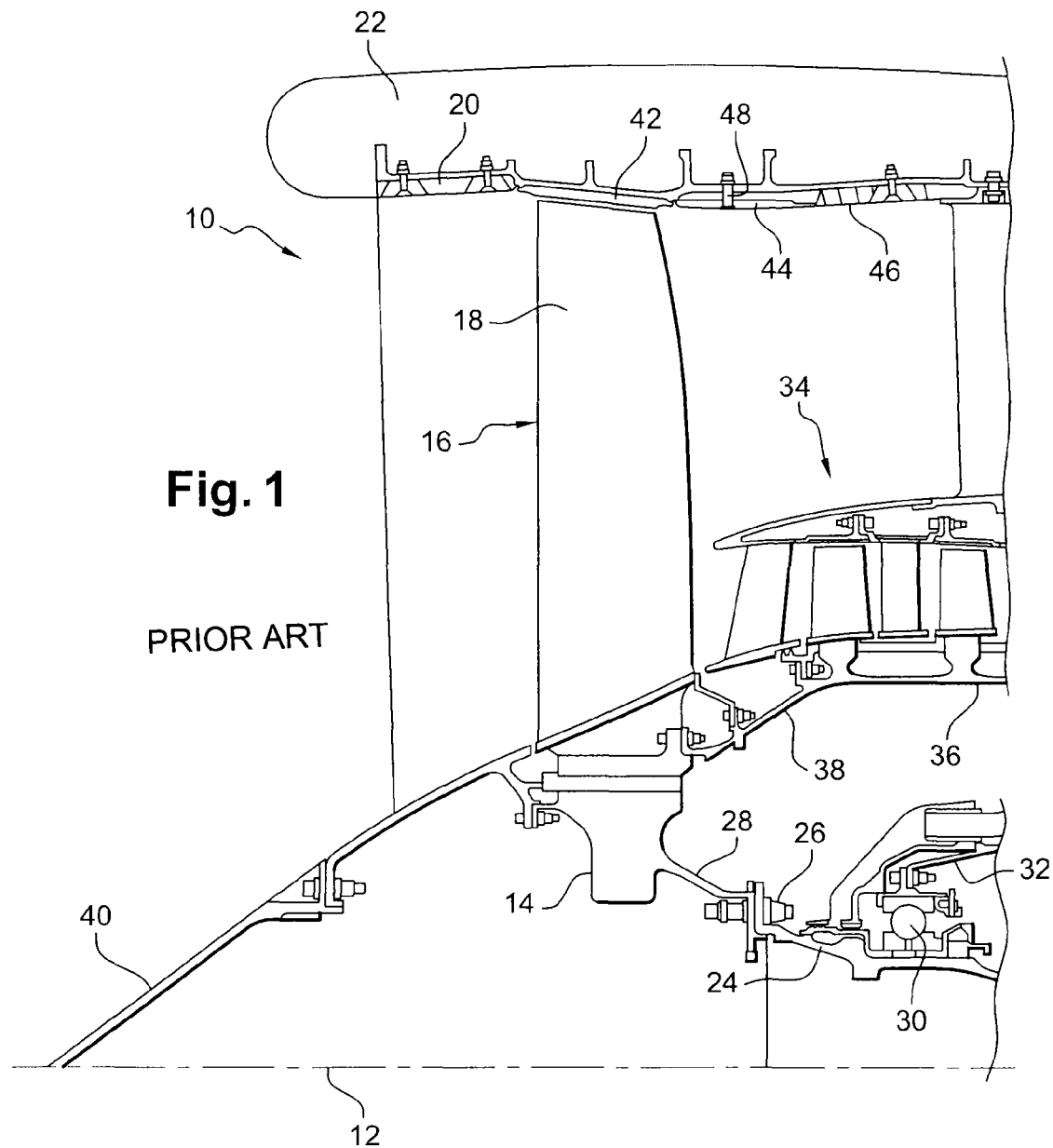
FIG. 1 is a diagrammatic half-view in axial section of a turbojet fan.
Figure 2:
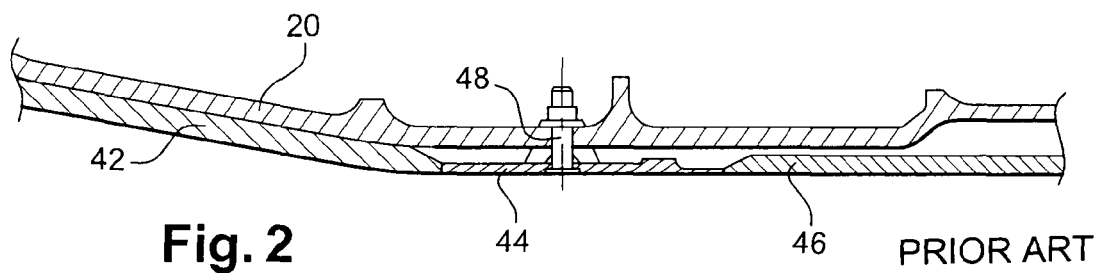
FIG. 2 is a diagrammatic axial section view of a prior art panel protecting the fan casing.

Reference is made initially to FIG. 1, which shows a fan 10 of a turbojet of axis 12, comprising a wheel made up of a disk 14 carrying a plurality of blades 16 at its periphery, the roots of the blades being engaged in grooves in the disk 14 and the airfoils 18 extending radially outwards towards a fan casing 20 that carries a nacelle 22 surrounding the blades 16 on the outside. The fan wheel is driven to rotate about the axis of the turbomachine 12 by a shaft 24 fastened by bolts 26 to a frustoconical wall 28 secured to the fan wheel. The shaft 24 is supported and guided by a bearing 30 that is carried by the upstream end of an annular support 32 fastened downstream to an intermediate casing (not shown) located downstream from a low-pressure compressor 34 having a rotor 36 that is secured to the fan wheel via a connection wall 38.

An inlet cone 40 is mounted at the upstream end of the turbojet in order to deflect the incoming air stream towards the blades 16 of the fan.

The fan casing 20 includes, on an inside face, a coating of abradable material 42 disposed in register with the blades 16 of the fan and designed to wear on coming into contact with the radially outer ends of the blades 16. This layer of abradable material 42 enables the clearance between the tips of the blades 16 and the fan casing 20 to be reduced, thereby optimizing the performance of the turbomachine.

A protective panel 44 is mounted downstream from the layer of abradable material 42 and is secured at its downstream end to a soundproofing panel 46. The protective panel 44 is fastened to the casing 20 via radial pins 48.

When the turbomachine is in operation, ice that accumulates at the surface of the cone 40 and at the radially inner ends of the blades 16 is ejected into the air inlet passage under the effect of centrifugal force and collides with the panel 44 that serves to protect the casing from ice impacts. The radial pins 48 serve to damp a fraction of the energy released by the ice impacts.

Nevertheless, making the protective panel 44 and the soundproofing panel 48 as a single unit turns out to be complicated and expensive for the reasons mentioned above.

Furthermore, with blades of wide chord, the impact zone extends not only downstream from the abradable material 42 but also over a portion of the abradable material 42 situated in register with the blades, and using a protective panel 44 downstream from the abradable material 42 does not provide effective protection for the entire zone of the casing 20 that is subjected to ice impacts.

The invention thus serves to remedy these problems and those mentioned above by incorporating protection against ice impacts within a panel for supporting the abradable material.

To do this, a laminated structure 50 comprising sheets of fiber embedded in a polymer covers the inside face of a rigid support 52 that is fastened to the fan casing and that comprises an upstream portion 54 carrying the abradable material 42 and a downstream portion 56 extending beyond the abradable material 42.

The upstream portion 54 of the laminated structure 50 is of constant thickness over the major fraction of its axial extent and it is connected to the downstream portion 56 via zone 57 of thickness that increases progressively going downstream. The downstream portion 56 of the laminated structure 50 presents thickness that is greater than that of the upstream portion 54 and thus constitutes a layer providing protection against ice impacts.

The rigid support 52 presents a cellular structure with its upstream and downstream ends closed by a layer of polymer foam 58.

Figure 3:
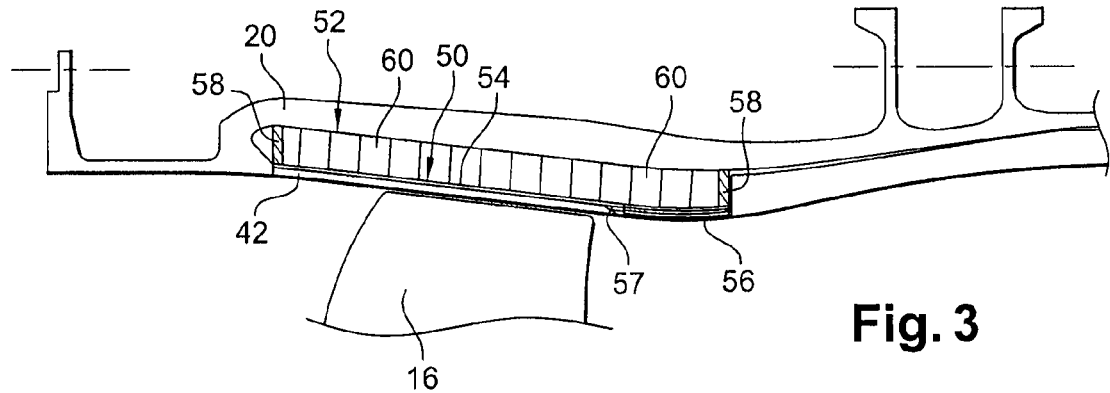
FIG. 3 is a diagrammatic axial section view of a fan casing including a panel of the invention for supporting an abradable material.

The cellular structure may have cells 60 of dimensions that are identical over its entire length (FIG. 3).

Figure 4:
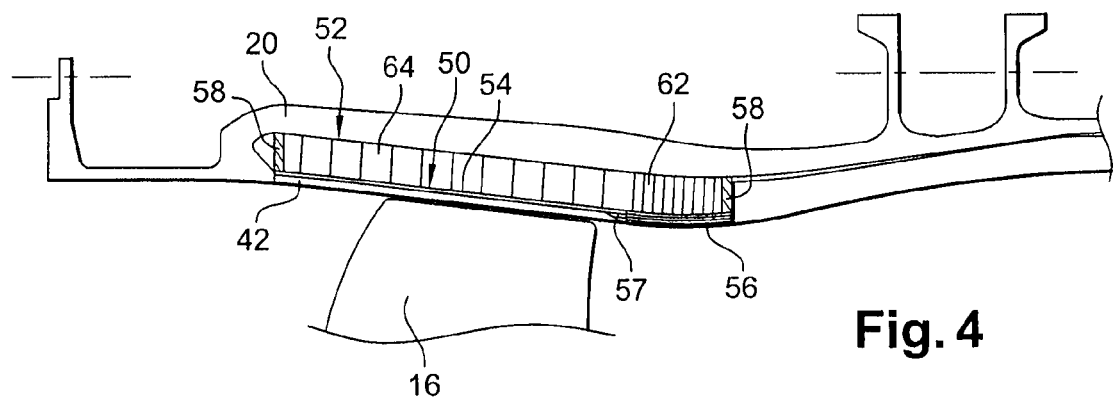
FIG. 4 is a diagrammatic axial section view of a fan casing including a panel according to an alternative of the invention for supporting an abradable material.

Alternatively, the cells 62 carrying the downstream portion 56 of the laminated structure 50 may be of smaller section than the cells 64 carrying the upstream portion 54 of the laminated structure 50. The majority of impacts take place in the downstream portion 56 of the laminated structure 50, so it is preferable to reduce the section of the cells carrying the downstream portion 56 of the laminated structure 50 so that the energy of an impact of a piece of ice is transmitted to a maximum number of cells 62 (FIG. 4).

Figure 5:
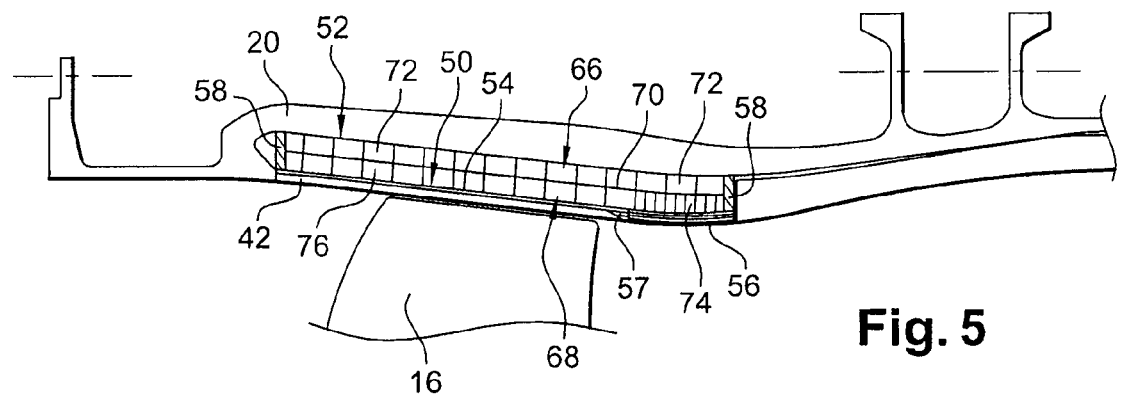
FIG. 5 is a diagrammatic axial section view of a fan casing including a panel according to another alternative of the invention for supporting abradable material.

FIG. 5 shows a rigid support 52 comprising two superposed layers of cellular structure comprising a radially outer layer 66 that is fastened to the fan casing 20 and a radially inner layer 68 that carries the laminated structure 50. The inner and outer layers 68 and 66 are separated by a plate 70. The cells 72 of the radially outer layer 66 all have the same section, while the cells 74 of the radially inner layer 68 that are fastened to the downstream portion 56 of the laminated structure are smaller in section than the cells 76 of the same layer carrying the upstream portion 54 of the laminated structure.

Other types of rigid support 52 could be used for supporting the laminated structure 50, such as foams, for example. Nevertheless, a cellular support presents the advantage of transmitting the energy of the impact of a piece of ice better than does a foam where the energy released during the impact remains locally concentrated.

In normal operation, the use of a cellular structure makes it easy to fill the space between the radially outer ends of the blades and the casing, instead of filling this space solely with the abradable material.

When the radial clearance between the casing 20 and the blades 16 needs to be large, e.g. of the order of 25 millimeters (mm) to 50 mm, it is preferable to make the cellular structure 52 in two layers so that the operator performing a maintenance operation can replace the radially inner layer only.

Advantageously, the cellular structure 52 is a honeycomb type structure and the fiber sheets are sheets of glass fibers embedded in an epoxy resin.

In a practical embodiment of the invention, the upstream and downstream portions 54 and 56 of the laminated structure 50 comprise a stack of four to seven fiber sheets and a stack of 11 to 18 fiber sheets respectively, with the variable thickness transition zone between the upstream and downstream portions 54 and 56 of the laminated structure 50 having an axial extent of 1 centimeter (cm) to 2 cm.

The panel for supporting abradable material is made by placing a plurality of layers of fiber sheets on a cellular structure 52 so as to have greater thickness at the downstream end of the panel than at the upstream end thereof. Since each glass fiber sheet has its component fibers in a preferred orientation, it is possible to stack the sheets in such a manner that the fibers of any one sheet are at an angle of 45° to the fibers of the sheet above it or below it. This arrangement enables the stiffness of the laminated structure 50 to be increased after it has been baked to polymerize and cure the fiber sheets.

The free face of the cellular structure is then adhesively bonded to an inner face of the fan casing 20, and the layer of abradable material 42 that is to come into contact with the radially outer ends of the blades 16 is applied to the inside surface of the upstream portion 24 of the laminated structure 50, e.g. using a spatula, so that the downstream end of the layer of abradable material 42 is in contact with the upstream end of the downstream portion 56 of the laminated structure 50.

The panel may be in the form of a cylindrical or conical sector and the nacelle 22 may have four to six panel sectors mounted end to end.

Separating the downstream soundproofing panel 46 from the laminated structure 50 that provides protection against ice impacts serves to simplify maintenance and to reduce the costs thereof. By means of the progressive change in the laminated structure between its upstream and downstream portions 54 and 56, such a panel for supporting abradable material also serves to provide effective protection over the major fraction of the casing zone that is subjected to ice impacts

What is claimed is:

1. A panel for supporting abradable material in a turbojet, the panel comprising a rigid support for fastening to an inside wall of a fan casing and having one face covered in a laminated structure carrying a layer of abradable material, the laminated structure comprising sheets of fibers embedded in a polymer, wherein the laminated structure comprises a first or upstream portion covered by the abradable material and a second or downstream portion that extends beyond the abradable material, a thickness of the downstream portion being greater than a thickness of the upstream portion and being capable of withstanding ice impacts.

2. A panel according to claim 1, wherein the upstream portion of the laminated structure is of constant thickness over a major fraction of its length and is connected to the downstream portion by a zone of thickness that increases progressively going downstream.

3. A panel according to claim 2, wherein the upstream portion of constant thickness extends over about two-thirds of the axial extent of the abradable material.

4. A panel according to claim 1, wherein the rigid support is of cellular structure.

5. A panel according to claim 4, wherein the rigid support comprises two superposed layers of cellular structure, separated by a plate.

6. A panel according to claim 4, wherein cells carrying the downstream portion of the laminated structure are of smaller section than cells carrying the upstream portion of the laminated structure.

7. A panel according to claim 4, wherein cells at the upstream and downstream ends of the support are closed by a layer of polymer foam.

8. A panel according to claim 1, wherein the rigid support is of honeycomb structure.

9. A panel according to claim 1, wherein the upstream portion of the laminated structure comprises a stack of four to seven sheets of fibers.

10. A panel according to claim 1, wherein the downstream portion of the laminated structure comprises a stack of 11 to 18 sheets of fibers.

11. A panel according to claim 1, wherein the sheets of fibers are sheets of glass fibers embedded in an epoxy resin.

12. A panel according to claim 1, in a form of a cylindrical or conical sector.

13. A turbojet nacelle, including panels according to claim 1 for supporting abradable material.

14. A nacelle according to claim 13, including four to six panels mounted end to end.

15. An airplane turbojet, including panels according to claim 1 for supporting abradable material, the panels being disposed in register with blades of a fan in such a manner that the downstream portions of the laminated structures of said panels extend downstream from the fan blades as far as soundproofing panels.

* * * * *